United States Patent
Greer

(10) Patent No.: US 8,247,054 B2
(45) Date of Patent: *Aug. 21, 2012

(54) ADHESIVE BACKED PREFORMED THERMOPLASTIC SHEETING

(75) Inventor: Robert W. Greer, Lexington, NC (US)

(73) Assignee: Flint Trading, Inc., Thomasville, NC (US)

( * ) Notice: Subject to any disclaimer, the term of this patent is extended or adjusted under 35 U.S.C. 154(b) by 340 days.

This patent is subject to a terminal disclaimer.

(21) Appl. No.: 11/377,733

(22) Filed: Mar. 16, 2006

(65) Prior Publication Data

US 2007/0218238 A1    Sep. 20, 2007

(51) Int. Cl.
  B32B 9/00   (2006.01)
  B32B 33/00  (2006.01)
  E01F 9/04   (2006.01)
(52) U.S. Cl. ....... 428/40.1; 428/42.1; 428/141; 428/143
(58) Field of Classification Search .................. 428/40.1, 428/42.1, 141, 143
See application file for complete search history.

(56) References Cited

U.S. PATENT DOCUMENTS

| | | | |
|---|---|---|---|
| 3,916,046 A | 10/1975 | Youngberg | |
| 4,005,239 A | 1/1977 | Davis et al. | |
| 4,123,581 A | 10/1978 | Davis et al. | |
| 4,725,641 A | 2/1988 | Comert et al. | |
| 5,145,718 A | 9/1992 | Pedginski et al. | |
| 5,232,763 A | 8/1993 | Holbek et al. | |
| 5,518,811 A | 5/1996 | Pedginski et al. | |
| 5,609,954 A | 3/1997 | Aizawa et al. | |
| 5,916,391 A | 6/1999 | Riedel et al. | |
| 5,929,167 A | 7/1999 | Gerard et al. | |
| 5,939,189 A | 8/1999 | Phillips et al. | |
| 6,270,871 B1 | 8/2001 | Scholz et al. | |
| 6,475,587 B1 * | 11/2002 | O'Neill | 428/40.1 |
| 6,503,621 B1 | 1/2003 | Ma et al. | |
| 6,540,865 B1 | 4/2003 | Miekka et al. | |
| 6,565,969 B1 | 5/2003 | Lamon et al. | |
| 6,613,430 B2 * | 9/2003 | Culbertson et al. | 428/352 |
| 6,875,487 B1 | 4/2005 | Williams et al. | |
| 2004/0058128 A1 | 3/2004 | Pacey | |
| 2005/0170126 A1 * | 8/2005 | Kawabata | 428/42.1 |

* cited by examiner

Primary Examiner — Patricia Nordmeyer
(74) Attorney, Agent, or Firm — Guerry L. Grune; ePatentmanager.com

(57) ABSTRACT

The present invention relates to a system, method, and composition utilizing a pressure sensitive adhesive (PSA) and/or thermal sensitive adhesive sheet for adhering sheets of preformed thermoplastic road markings, texture and design patterns to concrete, asphalt, wood or composite material surfaces. These markings may be decorative or legend type markings. The system involving the method of applying the product allows for immediate use in a traffic area upon completion of the application to any of the appropriate outdoor surfaces.

4 Claims, 5 Drawing Sheets

ADHESIVE BACKED PREFORMED THERMOPLASTIC SHEETING

FIELD OF INVENTION

The present invention relates to a system, method, and composition utilizing a pressure (PSA) and/or thermal sensitive adhesive sheet for adhering sheets of preformed thermoplastic road markings, texture and design patterns to concrete, asphalt, wood or composite material surfaces. These markings may be decorative or legend type markings.

BACKGROUND OF THE INVENTION

Whether individualizing a residential property or decorating a business using thermatically induced products, the opportunity exists to create walkways, sidewalks, driveways, front lobbies, formal entrances, etc., using artistically expressive decorative symbols for outdoor surfaces. Presently, many of the methods used are costly, time consuming, and require specialized equipment to create the desired effects. Often, decorative symbols on the surface outlive the desired purpose or can subsequently fail due to wear, abrasion and/or environmental exposure. The decorative symbols on the numerous types of surfaces they are adhered to, may later become unsightly remnants requiring cleanup or replacement.

The decorative sheets may be constructed as a thermoplastic, preformed thermoplastic, rubber, adhesive tile, tile cast into concrete, metal or other suitable material that will provide the proper decoration and also withstand abrasion and environmental extremes.

The preformed thermoplastic or thermoset may be alkyd or hydrocarbon based and includes a PSA (pressure sensitive adhesive) with one surface in contact with the thermoplastic sheet and the second side or surface correspondingly to be placed in contact with the concrete, asphalt, wooden or composite material surface.

Decorative preformed thermoplastic/thermoset sheets can be comprised of a wear-resistant top layer that is generally highly visible and optionally includes retroreflective elements to enhance detection when illuminated naturally or artificially. These elements can serve as indicia when installed upon the surface.

In order to fulfill their function in providing decorative patterns, thermoplastic sheeting may be applied to various substrates. Substrates, such as traffic surfaces, vary widely with regard to surface properties because the underlying material may be concrete, asphalt, wood or composite materials and may be of varying age, degraded physical condition as well as exposed to various temperature ranges, and may, on occasion, be moist, damp, or oily. Additionally, the surface may vary in texture from extremely rough to very smooth. The various substrates and corresponding surface properties, therefore, represent a considerable challenge for attachment.

Desired surfaces for corresponding decorative sheeting attachment may include vehicle surfaces for driveways, parking lots, bicycle paths, golf course paths, decks, patios and generally any surface where there may be pedestrian, powered vehicle traffic or building structures. Some examples of potential uses could be beautification programs, crosswalks, custom logos, entryways, driveways, sidewalk accents, parks and horizontal signage, or just advertising for increasing commerce for any given business endeavor.

Application of temporary decorative marking sheeting to a surface has typically been by contact cement or rubber-based PSAs. Attachment of permanent or semi-permanent decorative patterns to surfaces alternatively involves hot-melt adhesives, epoxy systems or use of soft butyl mastic materials. Normally, the bond strength will reach approximately 80 psi using PSA Thermoplastic signage requiring heat for application must reach a softening point within a range of about 100 degrees C. to about 125 degrees C. as determined by the ring and ball softening point test method specified in AASHTO Designation: M 249-98, section 12. In order to achieve semi-permanent or permanent adhesion of the pre-cut thermoplastic decorative pattern the typical user must purchase or rent a heating device of sufficient heat volume or contract with a business possessing specialized heating tools required.

It is therefore desirable to provide a thermoplastic decorative pattern that may be applied without the requirement or use of specialized (heating or other) tools. The present invention describes a system, method and composition for creating, adhering and installing a preformed thermoplastic decorative pattern to a surface utilizing a pressure sensitive adhesive (PSA) without requiring the use of specialized tools.

DESCRIPTION OF PRIOR ART

U.S. Pat. No. 5,145,718 to Pedginski, et. al., and assigned to 3M, describes a process for preparing a pressure-sensitive adhesive tape comprising the steps of: providing a backing made from a polymeric film and applying a layer of low-adhesion backsize composition to one major surface and applying a layer of pressure-sensitive adhesive to the major surface and upon cross-stretching of said layer-bearing backing and heating to allow sufficient softening so the pressure-sensitive adhesive can intermix. This method applies to marking tapes.

U.S. Pat. No. 6,503,621 to Ma, et. al., and assigned to 3M, describes a pressure sensitive crosslinked adhesive composition comprising at least one acrylate pressure sensitive adhesive component with at least one polymerized monofunctional (meth)acrylic acid ester monomer having a Tg of no greater than about 0° C. when homopolymerized; and 0 to about 10 wt % of at least one copolymerized monofunctional ethylenically unsaturated monomer having a Tg of at least about 10° C. when homopolymerized; and at least one thermoplastic elastomer-based pressure sensitive adhesive component comprising a radial block copolymer, wherein the acrylate pressure sensitive adhesive component and the thermoplastic elastomer-based pressure sensitive adhesive component are crosslinked. The present invention incorporates the use of a butyl based adhesive rather than an acrylate based adhesive and is not used for tape.

U.S. Pat. No. 3,916,046 to Youngberg, and assigned to 3M, describes a laminate article having an adhesive surface where the adhesive materials increase in tacking force and an adhesive bond is formed between the an article and the substrate surface upon the application of heat and pressure. The present invention does not require the use of heat to promote adequate adhesion between the appropriate surfaces.

U.S. Pat. No. 6,270,871 to Scholz, et. al., and assigned to Avery Dennison, describes a pressure-sensitive adhesive label construction comprising: a prelaminate construction, a layer of pressure-sensitive adhesive disposed on a release surface of a removable flexible substrate; and a continuous film layer disposed on the layer of pressure-sensitive adhesive that renders the pressure-sensitive adhesive nonblocking. An overlaminate film layer is disposed over a surface of the film layer wherein the continuous film layer has a viscosity that is within a range of viscosities that is compatible with the viscosity of the pressure-sensitive adhesive at a shear rate of approximately 40,000 s−1 and at a given application temperature. The present invention requires that any PSA system can be used as a raised pavement marking or as signage.

U.S. Pat. No. 6,540,865 to Miekka, et. al., and assigned to Avery Dennison, describes a method for forming a detackified pressure-sensitive adhesive construction comprising the step of depositing a layer of pressure-sensitive adhesive material onto a coating of release material disposed on a surface of a first flexible substrate, and during the same step simultaneously applying a detackifying material onto a surface of the pressure-sensitive adhesive material to form a continuous film thereon that occludes the pressure-sensitive adhesive layer and that has a minimum 24 hour blocking temperature of about 50° C. at a pressure at about 40 kilopascals, wherein the detackifying material has an open tack time of at least 0.25 seconds.

European Patent #EP0989162A1 to Mizumoto, et. al., and assigned to Daicel Chemical Ind., Ltd., describes a thermoplastic resin composition containing a thermoplastic resin and a solid plasticizer, said solid plasticizer is at least one compound selected from a multiester compound, an alcohol having a substituted cyclohexane ring or a substituted cyclohexene ring substituted by at least one of an alkyl group and having at least 3 carbons in the alkyl group or an alcohol having a bridged ring containing at least one of a six-membered carbon ring with a polybasic acid, a phosphorus compound having a melting point of 55-100° C. or hydroquinone or lesorcinol wherein a benzene ring may be substituted by an alkyl group or catechol wherein a benzene ring is substituted by an alkyl group with an organic monobasic acid.

U.S. Pat. No. 6,875,487 to Williams, et. al., and assigned to Foot-Wear, Inc., describes a heat-setting label sheet, which comprises: a support; a pressure sensitive adhesive layer comprising at least one material selected from the group consisting of a polyester having a glass transition temperature (Tag) of less than 0° C., an acrylic polymer having a glass transition temperature (Tag) of less than 0° C., and (c) a copolymer blend having a glass transition temperature (Tag) of less than 0° C., an Adhesion Layer on said pressure sensitive adhesive layer, said Adhesion Layer comprising at least one material selected from the group consisting of a thermoplastic polymer which melts in the range of 50-250° C., a wax which melts in the range of 50-250° C., and combinations thereof, wherein the Adhesion Layer is capable of being removed from the support without heat; a first optional opaque layer on said Adhesion Layer; a second optional opaque layer on said first optional opaque layer, or on said Adhesion Layer; and an image receiving layer on said Adhesion Layer, or on said first and/or second optional opaque layers, when present.

U.S. Pat. No. 5,916,391 to Riedel, ET. al., and assigned to Maritime Resource Group, describes a temporary protectant for a surface within a living area or vehicle comprising a thermoplastic film having a fire-retardant material incorporated directly therein, said film having a pressure-sensitive releasable adhesive on one of its sides that leaves substantially no adhesive residue upon removal of the protectant from a surface in the living area or vehicle.

U.S. Patent Publication No. 20040058128A1 to Pacey, describes a layered structure for providing an image on a desired surface comprising: a backing substrate layer, an image applied to an upper surface of the backing layer, a layer comprising a material with adhesive properties for adhering the lower surface of the backing layer to the said desired surface.

U.S. Pat. No. 4,725,641 to Comert, et. al., and assigned to Norton S. A., describes a thermoplastic pressure-sensitive adhesive composition comprising as essential elements: styrene-isoprene-styrene block copolymer having a melt index of 0.2 to 22 g per 10 minutes; 50 to 800 parts of a tackifying resinous constituent consisting of: 50 up to 500 parts of aliphatic hydrocarbon resin, having a softening point (ring and ball) of about 100° C., and 0 to 300 parts of C8-aromatic resin, or terpenephenolic resin, or a combination thereof, having a softening point (ring and ball) of up to 200° C., 1 to 300 parts of a copolyetheresteramide consisting of a product resulting from the polycondensation of an α,ω-dicarboxylic polyamide or copolyamide having a number average molecular weight of 300 to 15,000, employed in an amount of 90 to 5% by weight and of an aliphatic α,ω-dihydroxylated polyoxyalkylene having a number average molecular weight of 100 to 6,000, employed in an amount of 10 to 95% by weight, the said polycondensation product having a softening point (ring and ball) of between 80° and 210° C. and a viscosity in the molten state of 10 to 2,000 Pa·s at 200° C.; up to 200 parts of tackifying naphthenic oil; up to 300 parts of fillers.

U.S. Pat. No. 5,929,167 to Gerard, et. al., and assigned to Shell Oil Co., describes a pressure sensitive adhesive composition consisting essentially of a thermoplastic polyurethane and a tackifying resin, which thermoplastic polyurethane is derived from an aromatic diisocyanate and/or a cycloaliphatic diisocyanate; a chain extender; and a polymeric diol and/or a hydrogenated polydiene diol and a hydrogenated polydiene mono-ol, and wherein the number average functionality of the diol and mono-ol ranges from 1.2 to 1.8.

U.S. Pat. No. 5,609,954 to Aizawa, et. al., and assigned to Nitto Denko Corp., describes a strippable pressure-sensitive adhesive, comprising a highly elastic base polymer whose dynamic modulus of elasticity is in the range of from 250,000 to 10,000,000 dyne/cm2 at a temperature between ambient temperature and 150° C., said base polymer having incorporated therein a blowing agent, wherein the adhesive reduces or loses its adhesiveness on expansion or blowing of said blowing agent, and wherein said blowing agent is heat-expandable fine particles, the heat-expandable fine particles comprising first particles and second particles, said first particles having an average particle diameter of less than or equal to 7 μm, and said second particles having an average particle diameter of greater than or equal to 10 μm, wherein said first particles are present in an amount of between about 1 and about 50 weight percent based on the weight of the sum of the first and second particles.

U.S. Pat. No. 5,232,763 to Holbek, et. al., and assigned to A/S Jens Villadsens Fabriker, describes bituminous sheet coating material which comprises a bituminous layer having opposite sides and a heat-activatable adhesive layer covering one of said opposite sides, said adhesive layer providing a pattern of parallel grooves and intermediate unbroken ridges, said grooves being spaced by no more than 10 mm.

U.S. Pat. No. 4,005,239 to Davis, et. al., and assigned to Formica Corp., describes a decorative laminate foam panel comprising a heat and pressure consolidated decorative laminate adhesively bonded to a compressible, flexible, closed-cell, polypropylene plastic foam sheet by means of a uniform layer of an elastomeric adhesive wherein said heat and pressure consolidated decorative laminate is comprised of a plurality of paper core sheets impregnated with a thermosetting phenolic resin and surfaced with a decorative sheet which is impregnated with a noble thermosetting resin, each of said resins having been converted to the thermoset state during heat and pressure consolidation and wherein said foam sheet is bonded to the back flat surface of said laminate, the decorative side of said laminate is on the reverse side of said back surface and the back most surface of said panel is coated with a uniform layer of an elastomeric adhesive. Requires heat and pressure to activate the adhesive with the substrate surface.

U.S. Pat. No. 6,565,969 to Lamon, et. al., and assigned to 3M, describes an adhesive article comprising a bondable layer having on at least one major surface a layer of pressure sensitive adhesive, wherein the bondable layer comprises a thermosetting material, the pressure sensitive adhesive layer being substantially incompatible with the bondable layer both prior to and after curing of the bondable layer, and wherein the pressure sensitive layer substantially retains pressure sensitive adhesive characteristics after storage at room temperature for at least about three months prior to bonding the adhesive article, and the adhesive article has a overlap shear measured at room temperature according to ASTM D-1002-94 of at least about 6.9 MPa after bonding.

U.S. Pat. No. 5,939,189 to Phillips, et. al., and assigned to Flex Products, Inc., describes an optical article comprising a flexible plastic substrate having an index of refraction ranging from about 1.55 to about 1.71 and having first and second surfaces, and a two-layer anti-reflection coating carried by said first surface, said anti-reflection coating including a first layer of high index material with an index of refraction of about 2.0 or greater on the first surface of the substrate, the first layer having an optical thickness of one-half wavelength in the visible wavelength region, and a second layer of low index material with an index of refraction of about 1.38 or less on the first layer, the second layer having an optical thickness of one-quarter wavelength in the visible wavelength region, wherein the anti-reflection coating provides a reflectance less than about 1% substantially throughout the visible wavelength region. The article may be joined together with a pressure-sensitive adhesive carried by said second surface of the substrate and a release layer secured to the pressure-sensitive adhesive.

U.S. Pat. No. 4,123,581 to Davis, et. al., and assigned to A.B. Dick, Co., describes a self-adhering stencil comprising a porous stencil base tissue, a stencilizable layer present as a coating on the stencil base tissue and a heat sensitive adhesive material present as an outer layer on the stencilizable layer in an amount sufficient to yield a heat bond of minimum peel strength for bonding the stencil to a separate substrate.

Japanese Patent Application No. JP10230559A2 to Ogami, et. al., and assigned to Mitsubishi Paper Mills Ltd., describes an active layer containing at least titanium oxide and colloidal silica composite thermoplastic high polymeric emulsion are applied onto a flexible base material which is free from gas permeability. A colloidal silica layer is formed as the active layer, and deterioration of an optical catalytic function and degradation of high polymer component are restrained. Then, the colloidal silica composite thermoplastic high polymeric emulsion is effectively used as a binding agent for fixing titanium oxide onto the base material. As the base material, synthetic resin materials of polyethylene, polypropylene, etc., are used. A pressure sensitive adhesive layer is provided onto a rear surface of the base material, that which has gas permeability is unsuitable as the base material so that an optically reacted product on the active layer side does not transfer to the rear surface.

Japanese Patent Application No. JP08253744A2 to Kobayashi, and assigned to Sekisui Co. Ltd., describes a surface-protective film is prepared by forming a pressure-sensitive adhesive layer on either surface of a base material layer. The pressure-sensitive adhesive layer is made of a mixture comprising 100 pts.wt. block copolymer represented by the formula: A-B-A (wherein part of As and Bs may be replaced by A's and B's, and A or A' is a styrene copolymer block and B or B' is a butadiene copolymer block, an isoprene copolymer block or a polymer block obtained by hydrogenating it), 10-200 pts.wt. tackifier, and 1-50 pts.wt. styrene-phase-compatible resin, and the ratio of the melt viscosity of the thermoplastic polyolefin resin as the base material to that of the mixture of which the pressure-sensitive adhesive layer is made is 0.5-2.0.

Japanese Patent No. JP03359017B2 to Yasuda, and assigned to Shinko Kasei K K., describes a decorative-thermoplastic resin sheet for use as base material for decorative sheets comprising film-like thermoplastic resin containing synthetic paper laminated on either side of base sheet.

Japanese Patent Application No. JP52136283A2 to Nakano, et. al., and assigned to Toppan Printing Co. Ltd., describes a method to prevent the blister and delamination of decorative sheet caused by aging, by laminating a preformed decorative thermoplastic sheet onto a substrate having relieved or three-dimensional surface with an adhesive layer, and coating the laminate with rigid resin paint.

World Patent Application No. WO04026922A1 to Husemann, et. al., and assigned to Tesa Ag., describes a novel method wherein UV-initiated thermal cross-linking occurs according to a hot melt method for producing polyacrylate thermoplastic adhesive substances, wherein a polymer is produced from an acrylate-based comonomer mixture containing specific monomers which contain at least one functional group which can react with a photochemically produced base, optionally, by adding a catalyst said polymer is then coated on a carrier as part of the coating method or subsequently radiated and is finally thermally treated wherein cross-linking occurs between the polymer and the photochemically produced base. Structural cross-linking of the flat pressure-sensitive adhesive substance can be carried out if radiation occurs through a mask.

DETAILED DESCRIPTION OF THE DRAWINGS

Figure 1:
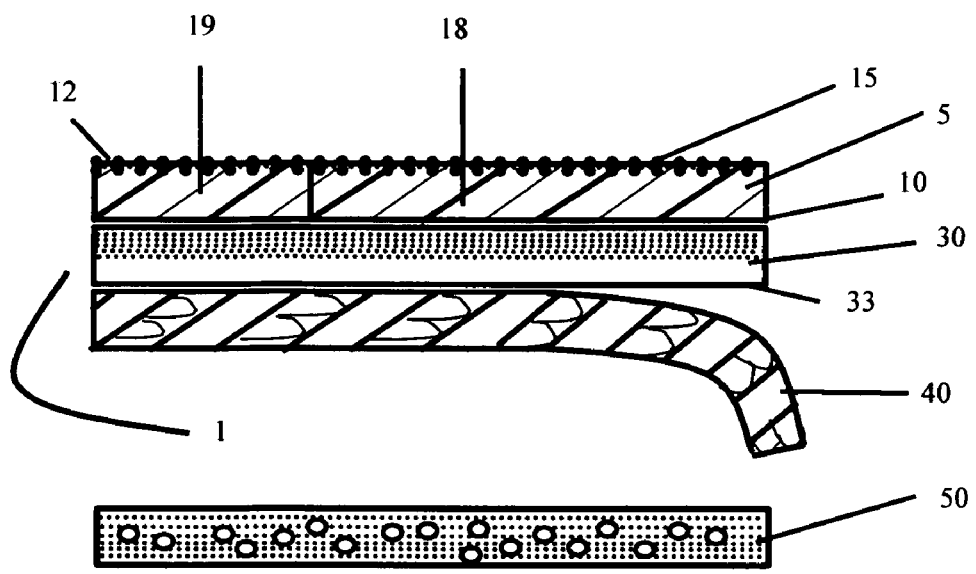
FIG. 1 illustrates a cross-sectional view of the preformed thermoplastic with the pressure sensitive adhesive and paper backing of the present invention.

FIG. 1 is a cross section view of a preformed thermoplastic sheet [5] which includes a bottom side [10] and a top side [12] that preferably has an aggregate [15] embedded in the top side [12] along with a patterned display or marker. The preformed thermoplastic sheet [5] may be comprised of multiple segments such as segment A [18] and segment B [19] that may be abutted or adjacent to additional segments.

A pressure sensitive adhesive [30] is in intimate contact with the preformed thermoplastic sheet [5] and a protective sheet [40] is then adhered to the pressure sensitive adhesive [30] surface adhesive side [33]. The predetermined patterned sheet [1] may be moved to the application surface [50] as the protective sheet [40] is peeled away to expose the surface adhesive side [33] to the application surface [50]. The surface adhesive side [33] thus contacts the application surface [50] forming an adhesive bond which is strengthened by application of pressure to the top surface [15].

SUMMARY OF INVENTION

The present invention relates to a system, method, and composition utilizing a pressure sensitive adhesive (PSA) and/or thermal sensitive adhesive sheet for adhering sheets of preformed decorative thermoplastic road markings, texture and design patterns to concrete, asphalt, wood or composite material surfaces. The present invention includes achieving sufficient adhesion without requiring the use of specialized tools.

The decorative sheets may be constructed as a thermoplastic, preformed thermoplastic, rubber, adhesive tile, tile cast into concrete, metal or other suitable material that will provide the proper decoration and also withstand abrasion and environmental extremes.

The preformed thermoplastic or thermoset may be alkyd or hydrocarbon based and includes a PSA (pressure sensitive adhesive) with one surface in contact with the thermoplastic sheet and the second side or surface correspondingly to be placed in contact with the concrete, asphalt, wooden or composite material surface.

In order to achieve semi-permanent or permanent adhesion of the pre-cut thermoplastic decorative pattern the typical user must purchase or rent a heating device of sufficient heat volume or contract with a business possessing specialized heating tools required.

It is therefore another object of the invention to provide a thermoplastic decorative pattern that may be applied without the requirement or use of specialized (heating or other) tools. The present invention describes a system, method and composition for creating, adhering and installing a preformed thermoplastic decorative pattern to a surface utilizing a pressure sensitive adhesive (PSA) without requiring the use of specialized tools.

Additionally, the present invention relates to a system, method and composition for utilizing an emulsion based, solid, single component, multiple component, or radiation curable pressure adhesive sheet composition that may require energy activation for adhering thermoplastic or preformed thermoplastic or thermoset patterns to various surfaces. One embodiment includes preferably, a PSA that is based on butyl moieties in the adhesion chemistry with a silicon sheet on one or both sides of the PSA composition.

More specifically the invention relates to a system, method and composition of preformed thermoplastic patterns manufactured in segments optionally joined either in pre or post shipment to the customer, such that the joining of the segments form a continuous customizable pattern.

The joining method and composition of the decorative preformed pattern segments includes a customizable sheet of pressure sensitive adhesive.

The markings associated with the top surface of the preformed thermoplastic or thermoset sheets may be decorative or legend type markings or road indicia or the like.

DETAILED DESCRIPTION OF THE INVENTION

The present invention relates to a system, method and a composition for adhering preformed thermoplastic patterns that are hydrocarbon or alkyd based thermoplastics or thermosets with various surfaces utilizing a pressure sensitive adhesive (PSA) to provide permanent or semi-permanent patterns.

The present invention can best be described in terms of the installation and implementation and following instructions apply;

Manufacturing Instructions:
a) Start with a preformed thermoplastic patterned sheet of the current invention.
b) Cut the preformed sheet into decorative segments.
c) Apply PSA silicon based sheets on one or both sides.
d) Place segments adjacent to each other to form decorative/predetermined patterns.
e) Join segments with PSA into one or several manageable pieces.
f) Ship manageable pieces to the application site (and application surface where adhesion is required).

Application Instructions for the Present Invention:
Pressure Sensitive Preformed Thermoplastic Surfacing & Marking Material
General Information ReadyMark™ is a durable horizontal and vertical surface overlay material suitable for horizontal signage, logos, slip proofing, and decorative surfacing of walkways, light traffic roadways, access routes, ramps, etc., located near on within residential and commercial buildings and facilities such as schools, hospitals, shopping malls, airports, bus terminals, train stations, etc. The material is equally suitable for concrete, asphalt, metal, glass, and plastic surfaces. Ready-Mark™ consists of a solid sheet or a pattern of interconnected individual pieces of preformed thermoplastic material mounted on a sheet of pressure sensitive adhesive with a peel-off liner. The application procedure requires the use of a tamping roller, such as the use of the ReadyMark™ Roller. ReadyMark™ provides a wear-resistant, non-skid/non-slip, durable surface that can be used in traffic areas immediately after application is completed.

General Requirements

The list of requirements below are provided to the user and are necessary to insure proper installation and longevity of the product for any application.

Moisture: It is important to ensure that no surface moisture is present prior to applying ReadyMark™ or ReadyMark™ Sealer to the application surface. The presence of moisture can be mitigated by taping a segment of dark plastic sheeting, approximately 18 in.×18 in., tightly to the surface, making sure that all edges are sealed with duct tape. A plastic sheet should be applied in an area where it is exposed to sunlight. After 20-30 minutes it is possible to get an early indication of the presence of moisture by lifting a corner of the plastic sheet and visually inspecting it for any moisture that may have accumulated on the underside of the sheet. FIG. 1 provides a visual rendition of this task. If no moisture is present, proceed to the second section entitled "Surface" below. If moisture is present the application should be completed at a later time when the surface is moisture free. It is not advisable to apply ReadyMark™ if a rainfall/spill has occurred within 24 hours or if the ambient humidity is greater than 80%.

Surface: The application surface must be free of dirt, dust, chemicals and significantly oily substances. Concrete must be free of curing compounds and laitance. ReadyMark™ can be applied directly on very smooth clean surfaces (glazed ceramic tile, polished concrete, smooth metal, polished granite, etc.). On all other surfaces such as regular concrete, asphalt, granite, etc., ReadyMark™ Sealer must be applied before applying the ReadyMark™ material. It is not recommended to apply ReadyMark™ on top of top of paint, thermoplastic, cold plastic, or other types of floor surfacing materials and pavement coatings. The surface and ambient air temperature must be at least 50° F.

Material: ReadyMark™ shall be kept dry at all times—in storage, in transit and on the project. Avoid extreme storage temperatures. ReadyMark™ should be stored in a building that is between 35° F. and 90° F. The packages should be stored flat and stacked a maximum of 25 packs high. The expected minimum shelf life for this product is 12 months.

Safety Precautions

ReadyMark™ Sealer is highly flammable. Skin and eye contact with the ReadyMark™ Sealer should be avoided by wearing protective equipment necessary including eye, and hand protection. Keep containers tightly sealed when not in use. The sealer should be kept out of the reach of children.

Application Procedure

Figure 2:
FIG. 2 illustrates how to check for moisture using plastic and duct tape test
Figure 3:
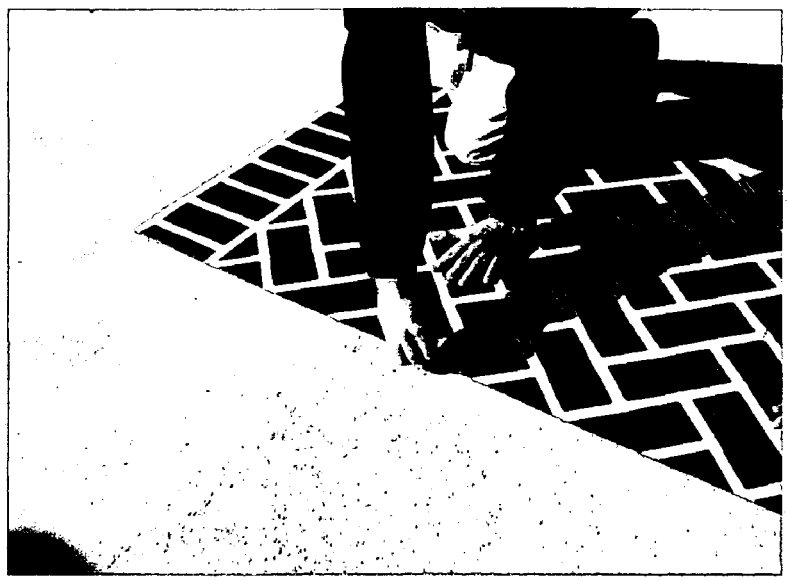
FIG. 3 Marking the outline of the application area.
Figure 4:
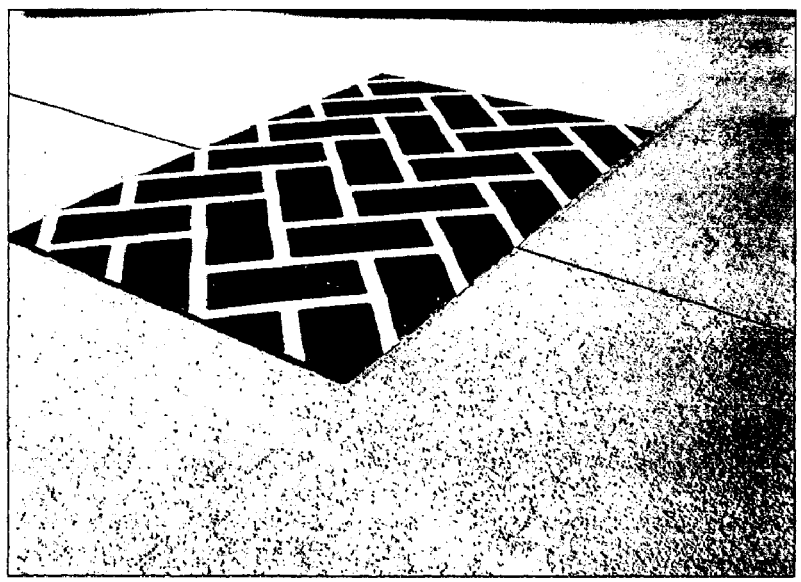
FIG. 4 When applying several sheets with butt joints, work from butt joint line close to the center of the application area.
Figure 5:
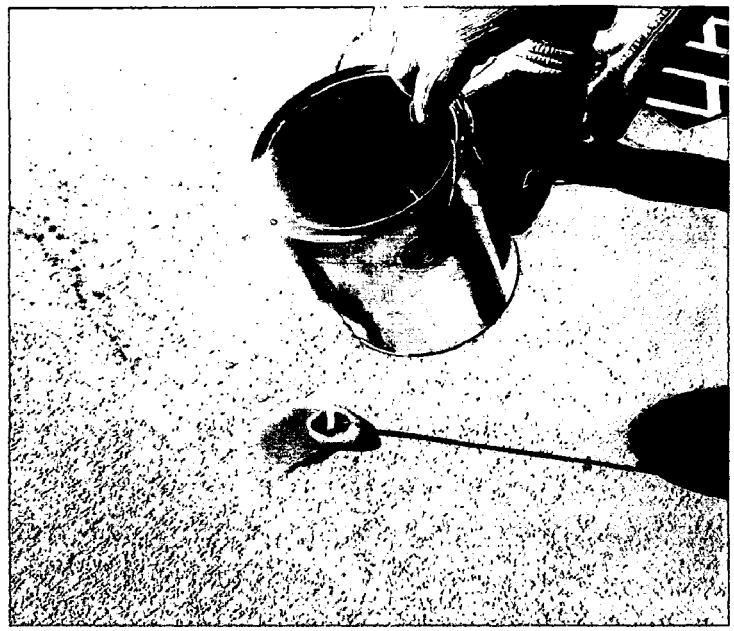
FIG. 5 Pouring ReadyMark™ Sealer to a section of the application area.
Figure 6:
FIG. 6 Spreading the ReadyMark™ Sealer with a roller not to exceed a four sheet area (approx. 4'×6' area)
Figure 7:
FIG. 7 Making sure the sealer is completely dry when touched with fingertip (being sure to use gloves!)
Figure 8:
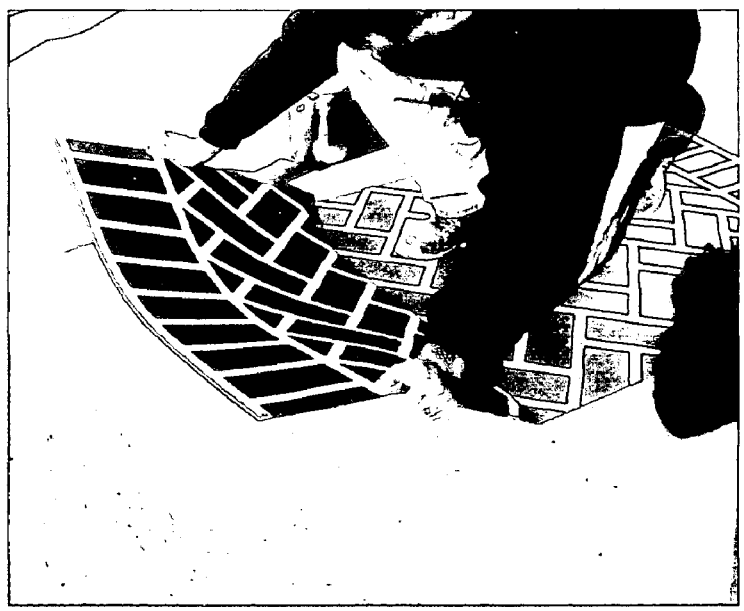
FIG. 8 Removing peel-off liner from back of the material and placing on surface one sheet at a time in a rolling motion.
Figure 9:
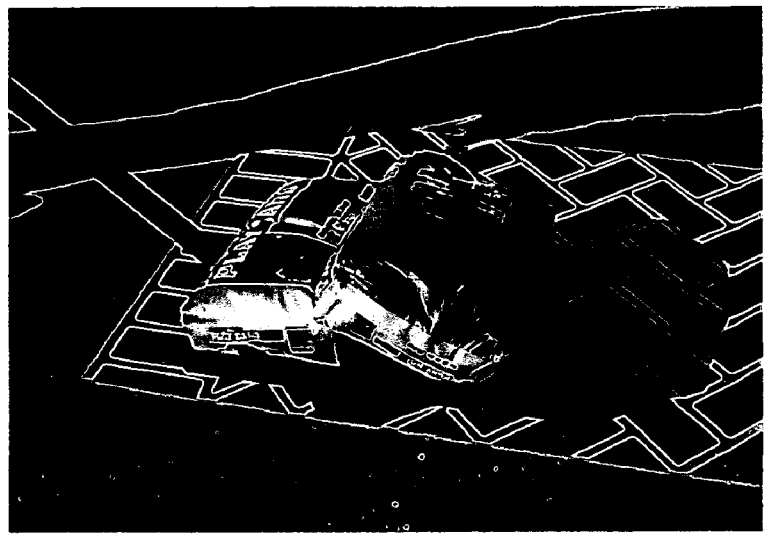
FIG. 9 Using a roller such as the ReadyMark™ Roller to pre-tamp with a load of 100 lb. to level out any bubbles and to close butt joints.
Figure 10:
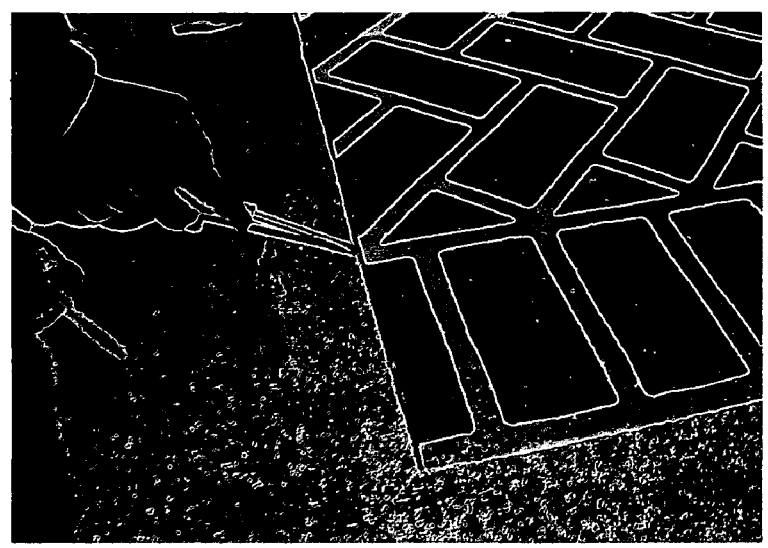
FIG. 10 Checking adhesion using a screwdriver or similar instrument. Proper adhesion is achieved if material is difficult to pry.

1. The application area should be thoroughly cleaned. All loose particles, sand, dust, etc. must be removed. Utilize a power blower or compressed air if available, otherwise sweeping the surface completely clean should be adequate.
2. Ensure that no moisture is present. See "Moisture" under General Requirements (above).
3. Using a crayon, chalk, chalk line, or other marking tool, carefully mark the outline of the ReadyMark™ application. FIG. 2 provides a visual indication of this step in the method. For applications requiring several sheets with butt joints, it is recommended to work from a butt joint line close to the center of the application area rather than from an edge. FIG. 3 indicates how this step should be performed.
4. If it has been determined that the use of the ReadyMark™ Sealer is not required then proceed directly to Step 6 outlined below. If the ReadyMark™ Sealer is required the use of a paint roller, or a paint brush can be used to apply ReadyMark™ Sealer to the entire application area if the application consists of four sheets or less of ReadyMark™. The sealer should extend ½ in. beyond the edge of the material. FIGS. 4 & 5 indicate how this step should proceed. For larger applications, apply the sealer only to a portion of the total area to be covered, making certain not to exceed covering a four sheet area. It is always necessary to ensure that the ReadyMark™ material can be applied without working from an area where sealer has been applied. Walking on the applied sealer is not recommended. The average coverage is 150 square feet per gallon of Ready-Mark™ Sealer on concrete surfaces. The sealer should always be sealed well before using. The container should be kept closed when not in use. Use only in well ventilated areas is also recommended.
5. Before applying the ReadyMark™ material, the sealer needs to be completely dry. The drying time depends on the structure and porosity of the surface to be covered, and ambient conditions. It is possible to determine if the sealer is dry and ready for the ReadyMark™ application when it does not lift and string when touched with a fingertip (using gloves), but still appears to remain somewhat tacky. FIG. 6 indicates how to proceed with this method step.
6. Next, removal of the peel-off liner from the back of the ReadyMark™ material is required. Aided by the application outline marks, or butt joint line for larger applications, the ReadyMark™ material is placed on the application surface one sheet at a time. To do so, one must first carefully place one edge of the marking, or sheet, in its correct location, and then apply the rest of the sheet in a rolling motion. FIG. 7 shows how this step is performed. For larger applications, it is recommended one use a straight edge (such as an angle iron) for the first course of sheets. It is not allowed that the ReadyMark™ material touch the application surface until the material is in the proper position to be applied. Cut/score ReadyMark™ over all cross-seams, joints and cracks in the application area. Then one can repeat step 4 through 6 until the application is complete.
7. Using a tamping roller such as the ReadyMark™ Roller, pre-tamp the applied material with a load of 100 lb., leveling out any unintended bubbles and closing butt joints. FIG. 8 shows this step.
8. Thoroughly tamping the entire application area with a load of 200 lb should be sufficient for the necessary adhesion with the surface. Starting in the center of the application surface area, and then working toward the edges to remove trapped air is recommended. Making four complete passes (two passes back and forth), and then four complete passes in a perpendicular direction is also recommended. When tamping with a vehicle tire, drive slowly over the material three times. It is not wise to turn the tire on applied material. The edges are to be well adhered. To test adhesion use of a screwdriver or similar instrument can be tried to pry up a portion of the marking. If the material is difficult to pry up then one has achieved proper adhesion. FIG. 9 indicates this method step. Twisting or turning the tamping device on the ReadyMark™ material is also not recommended.
9. Open application to traffic.

What is claimed is:

1. An outdoor pavement marking system consisting essentially of at least two preformed thermoplastic sections including top sides with textures and design patterns and bottom sides with adhesive backed sheeting residing on said bottom sides of said preformed thermoplastic sections; and;
    a single protective sheet that covers said sheeting on the bottom side;
    wherein said protective sheet comprises a silicone elastomer covering said sheeting and wherein said bottom sides of the preformed sections are subsequently adhered to any suitable outdoor surface after removing said protective sheet from said adhesive backed sheeting and using at least pressure to provide the bond strength necessary to ensure a proper surface covering, wherein said suitable outdoor surface includes thermoplastic road markings, and wherein said preformed thermoplastic sections form a decorative layer; wherein said preformed thermoplastic sections are abutted with said sheeting underlying the abutted portion to help form said decorative layer capable of withstanding exposure to outside weather elements and wherein said decorative layer contains particles causing a suitable outdoor abradable resistant surface for road markings, walkways, and other outdoor surfaces and wherein the chemical composition of said adhesive layer used for said sheeting is either alkyl or butyl based.

2. The system of claim 1, wherein said preformed thermoplastic sections are matched with at least one other preformed thermoplastic section such that said decorative layer provides a desired pattern.

3. An outdoor pavement marker product consisting of an adhesive backed sheeting; wherein the adhesive back sheeting has at least two preformed thermoplastic sections comprising top sides with textures thereby forming a decorative layer and bottom sides with a single, continuous curable resin adhesive layer over a primer layer underlying the at least two preformed sections; said adhesive layer, said primer layer and said at least two preformed thermoplastic sections together forming said adhesive backed sheeting;

and;

a single protective sheet that covers said adhesive backed sheeting on said bottom side; wherein said protective sheet comprises a silicone elastomer that covers said adhesive backed sheeting on said bottom side such that said protective sheet is removable and allows for required adhesion of said bottom side to any suitable outdoor surface after removing said protective sheet from said adhesive backed sheeting and using at least pressure to provide the bond strength necessary to ensure a proper surface covering of said pavement marking system, wherein said suitable outdoor surface includes concrete, asphalt, wood or composite material surfaces; the at least two preformed thermoplastic sections are abutted with said adhesive backed sheeting underlying the abutted portion, said decorative layer is capable of withstanding exposure to outside weather elements and wherein said decorative layer contains particles that provide for suitable outdoor abradable resistant surfaces for road markings, walkways, and other outdoor surfaces and wherein the chemical composition of said adhesive layer used for said adhesive backed sheeting is either alkyl or butyl based.

4. The preformed thermoplastic sections of claim 3, wherein said thermoplastic sections are matched with at least one other preformed thermoplastic section such that said decorative layer provides a desired pattern.

* * * * *